United States Patent Office
3,496,045
Patented Feb. 17, 1970

3,496,045
METHOD OF HEAT SEALING TEXTILES
Wolfgang Keberle, Leverkusen, Karl-Arnold Weber, Cologne-Stammheim, and Gerhard Berndt, Monheim, Rhineland, Germany, assignors to Farbenfabriken Bayer Aktiengesellschaft, Leverkusen, Germany, a corporation of Germany
No Drawing. Filed Apr. 17, 1967, Ser. No. 631,157
Claims priority, application Germany, Apr. 21, 1966, F 48,984
Int. Cl. B32b 9/02, 31/20
U.S. Cl. 156—331                                  8 Claims

ABSTRACT OF THE DISCLOSURE

Textile bonds are formed by heat sealing the textiles using a polymer of hexane-1,6-diisocyanate and methylhexane-1,6-diol as the heat sealing adhesive.

---

This invention relates to the bonding of textiles and more particularly to bonding textiles with a heat sealing adhesive.

The heat-responsive or heat-sealing adhesives are usually inactive solids at room temperatures which may be converted by application of heat to a sticky, molten condition. The bonding of textiles with heat sealing adhesives is known. Heretofore thermoplastics such as waxes or synthetic hydrocarbons have been used as heat sealing adhesives. In practice the heat sealing adhesive is applied to the textiles, for example by spreading thickened pastes or solutions onto the surface with wiper blades, by sprinkling loose powders onto the surface, by spraying in the form of dispersions or solutions, or by sprinkling fleeces or fibers onto the textile. The different parts of material are then bonded together by heat and pressure as with a hot iron.

The heretofore known heat sealing adhesives leave much to be desired as to toughness, flexibility and resistance to moisture, solvents and chemicals; particularly dry cleaning agents. Low pressure polyethylene powder has been used and the bonds obtained with it are strong, but are attacked by chemical cleaning agents as soon as temperatures of about 50 to 60° C. are exceeded. This limits the range of application and usefulness of low pressure polyethylene powder.

The use of polyurethanes as heat sealing adhesives for textile bonds is also known. For example one may use a polyurethane formed by reaction of butane-1,4-diol and hexamethylene-1,6-diisocyanate to which plasticizers such as soft polyamides are added to lower its softening point and the temperature for pressing. However, temperatures above 200° C. are required to achieve bonding. Such high temperatures are impractical for most applications.

In addition, the polyamide which is added as plasticizer reduces the strength of the bond, especially if it is caused to swell, or is dissolved by solvents such as aqueous alcohol, or extracted by them. The strength of the bond is thereby diminished and the bonded textiles have poor flexibility.

It is therefore an object of this invention to provide an improved method of bonding textiles which produces bonds with improved toughness, flexibility and resistance to chemicals particularly dry cleaning solvents and the like. Another object of this invention is to provide an improved heat sealing adhesive for use in bonding textiles. A further object of this invention is to provide a method of heat sealing textiles which can utilize powder spraying techniques. Another object of this invention is to provide heat sealing adhesives which are soft without having the disadvantages of hydrocarbon heat sealing adhesives.

The foregoing objects and others which will become apparent from the following description are accomplished in accordance with this invention, generally speaking, by providing a heat sealing adhesive for textile bonds which is a polymer of hexane-1,6-diisocyanate and a monomeric organic diol, sufficient of said diol consisting of 2- or 3-methylhexane-1,6-diol so that at least 9 percent by weight of said polymer is derived from 2- or 3-methylhexane-1,6-diol. In other words, the invention contemplates applying the above defined polymer to at least one surface of a textile material, contacting the textile material to be bonded under heat and pressure and allowing the resulting bond to cool. In accordance with a preferred embodiment of the invention the polymer used is prepared by reacting hexane-1,6-diisocyanate with 2-methyl or 3-methylhexane-1,6-diol or a mixture thereof as essentially the sole polymer forming components. In accordance with another preferred embodiment a mixture of 2-methyl and/or 3-methylhexane-1,6-diol and hexane-1,6-diol is used to prepare the polymer by reaction thereof with hexane-1,6-diisocyanate, the 2-methyl and/or 3-methylhexane-1,6-diol being present in such amounts that it accounts for at least 9 percent by weight of the polymer. It is preferred that the 2-methyl or 3-methylhexane-1,6-diol account for 22 to 44 percent by weight of the polymer. It is possible but not preferred to use mixtures of 2-methyl and/or 3-methylhexane-1,6-diol with other monomeric organic diols and preferably of low molecular weight (i.e. 90 to 300) aliphatic diols such as hydrocarbon diols including ethylene glycol, 1,3-propane diol, 1,4-butane diol, 1,5-pentane diol and the like; ethers such as bis(4-hydroxy-butyl) ether, diethylene glycol and the like, thioethers such as thiodiglycol, bis(4-hydroxy-butyl) thioether and the like or dialkanol amines such as N-methyl-diethanol amine and the like. It is preferred that the polymer be based entirely on hexane-1,6-diisocyanate and 2-methyl and/or 3-methylhexane-1,6-diol or mixtures of these methylhexane diols with hexane-1,6-diol as essentially the sole polymer forming components. It is preferred that the polymer, regardless of the exact components have a molecular weight of 3,000 to 50,000 and most preferably 3,000 to 15,000. The polyurethanes are preferably used in the form of spraying powders having a particle size of between 0.05 and 0.7 mm., most preferably 0.1 to 0.5 mm. in diameter. The softening points of the polyurethane polymers to be used according to the invention are in the region of 100° C. to 120° C. For example, the polyurethane prepared from hexane-1,6-diisocyanate and only methylhexane-1,6-diol melts at 104 to 106° C.

The heat-sealed bonds produced with the polyurethanes to be used according to the invention have, surprisingly, bond strengths which would not be expected of such low melting linear and noncross-linked polyurethanes. A particularly good bond is obtained to wool, wool-like mixtures or mixtures containing wool, polyamides, polyester and polyacrylonitrile fabrics. The bond is also adequate with fabrics made from other synthetic materials which contain sufficient polar groups. Quite excellent adhesive properties are observed if the materials to be bonded also contain polyurethane fibers. Polyurethane fabrics are disclosed for example in U.S. Patent 3,097,192.

Thus, the invention contemplates using the above-defined polymers for the heat-sealing of a wide variety of textiles or fabrics, including those containing keratin fibers, such as wool, alpaca, vicuna, mohair, cashmere, guanaco, camel's hair, silk, llama and the like; synthetic fibers including the cellulosics, such as regenerated cellulose, e.g., viscose rayon and the like; fibers containing a limited number of acetyl groups, such as cellulose acetate, cellulose triacetate and the like; and fibers containing a limited number of methyl ether groups, such as partially methylated cellulose, and the like; polyamides, such as poly (hexamethylene adipamide); polyesters, such as poly(ethylene terephthalate); and acrylic fibers, such as acrylonitrile homopolymers and copolymers containing at least about 85% acrylonitrile, such as acrylonitrile/methyl acrylate (85/15) and the like, or vegetable fibers such as cotton and the like.

The polyurethanes which are to be used according to the invention as heat sealing adhesives may be prepared by the solution process in which the solvents preferably have boiling points below the melting point of the polyurethane to be produced, and may be for example acetone, tetrahydrofuran, dioxane, methyl ethyl ketone, benzene or the like. The components are preferably heated in the solvent to the boiling point of the solvent and should be present so as to give an NCO/OH ratio of approximately 1:1, although this ratio may differ slightly from 1. The polyurethane starts to separate from the solvent after some time. The polyurethane powder is preferably removed by suction filtration and dried.

The polyurethane can also be prepared in the absence of solvent, in the melt, for example, by heating for several hours at 80 to 120° C.

The components may also be reacted in a solvent in which the reaction product is also soluble. Such solvents are, for example, formamide, dimethylformamide and dimethylsulphoxide. The dissolved reaction product is isolated either by distilling off the solvent by spray drying or by precipitation of water or a solvent in which the reaction product is insoluble or only slightly soluble, and which is readily or at least partly miscible with the solvent in which the polyurethane dissolves.

The isolated reaction product is freed from residual solvent by drying, if desired in vacuo, and if desired at elevated temperature. Tetrahydrofuran and acetone have been found to be particularly suitable for precipitation purposes.

In order to use the heat-sealing adhesive as a powder which can be sprinkled, the crude product may be granulated or reduced to the required particle size by disintegration and grinding, if desired in the presence of Dry Ice, and with the use of fractionating sieves.

Methyl-hexane-1,6-diol which is to be used can be obtained by hydrogenating the diethyl ester or butyl ester of methyl-adipic acid. The ester is obtainable by a simple reaction from methyl adipic acid which is obtained by oxidation of methyl cyclohexanol or methyl cyclohexanone with nitric acid, if desired in the presence of copper. The starting material used is the technical mixture of isomeric methyl cyclohexanols and methyl hexanones. The methylhexane-1,6-diol prepared in this way accordingly contains the two isomers 2- and 3-methylhexane-1,6-diol in addition to small quantities of hexane-1,6-diol which is produced by oxidation of the 2-methyl isomer in the commercial isomeric mixture of methyl cyclohexanols or methyl cyclohexanones.

The method of the invention involves placing the polymer in any suitable form such as a powder, a fiber, a thin film or the like in contact with the textile surfaces to be bonded and subjecting the surface to heat and pressure for a time sufficient to cause the bond to form and then allowing the bond to cool. As pointed out above it is preferred to use the polymers in powder form. It is also preferred to use the powder in the particle size above in an amount of about 5 to 30 grams per square meter and to preheat the powdered fabric to cause adhesion of the powder, then assemble the coated textile with another sheet in the desired position and subject it to heat and pressure. It is preferred to heat the assembly to a temperature of 100 to 200° C. at a pressure of 10 to 75 grams per square centimeter. The most preferred temperature range is 120 to 160° C. and at pressures of 25 to 50 grams per square centimeter.

The following polyurethane powders which have a particle size of 0.1 to 0.5 mm. are examples of suitable polyurethane materials for the production of textile bonds by heat sealing:

(A) A polyurethane powder is prepared from 56 percent hexane-1,6-diisocyanate and 44 percent methylhexane-1,6-diol isomeric mixture (obtained from commercial methyl cyclohexanol isomeric mixture) by reaction for several hours in benzene at 80° C. The polyurethane is isolated dried, disintegrated and ground. The polyurethane powder obtained is made up to the required particle size by fractional sieving. Melting range 104 to 106° C.

(B) A polyurethane powder is obtained from 56 percent hexane-1,6-diisocyanate and 44 percent methylhexane-1,6-diol isomeric mixture (prepared from commersial methyl cyclohexanol isomeric mixture) by reaction for several hours in dimethylformamide at 120° C. followed by precipitation with acetone. The dried polyurethane is made up to a paste with water, granulated moist and dried. The granules obtained are slightly sintered to increase the grain hardness and then fractionated through sieves. Melting range 102 to 106° C.

(C) A polyurethane powder is obtained from a mixture of 60.2 percent hexane-1,6-diisocyanate, 30.4 percent diethylene glycol and 9.4 percent methylhexane-1,6-diol isomeric mixture (prepared from commercial isomeric mixture of methyl cyclohexanol) by reaction in benzene at 80° C. The polyurethane produced is freed from solvent and is then ground into a powder and fractionated through sieves. Melting range 113 to 117° C.

Bonds produced by these polyurethanes are resistant to washing and dry-cleaning agents, and are fast to light, they can be produced, for example, as follows:

The powders are uniformly distributed, in a thickness of about 6 to 30 g./m.$^2$ on to the surface of the support, which is, for example a woven fabric or fleece, by shaking them onto the fabric through a sieve. The supporting surfaces carrying the powders are then exposed for about 10 seconds to the action of an infra-red radiator which is about 10 cm. from the support, and whose power uptake is 1500 watt for a surface area of 300 cm.$^2$. The surface temperature of the support is then about 120° C. The powder starts to sinter and is bonded permanently to the surface of the support. The supporting material is removed from the heating zone and later it is joined to another sheet structure, for example a cotton poplin (or polyacrylonitrile knitted fabric or fleece) to form a bonded material. For this purpose, the support material and the above-mentioned second material are placed together in such a manner that the heat sealing adhesive forms a middle layer between the two materials. By subjecting them to heat and pressure for about 15 seconds under a pressure of 0.04 kg./cm.$^2$, at a temperature of about 130° C. the materials are bonded together in a flat press. The adhesive becomes plastic within this time and permanently binds together the support and the material placed on it. The composite bonded material is removed, e.g. from the flat iron press, and is ready for use immediately on cooling.

(D) A polyurethane powder is obtained from a mixture of 56.6% hexane-1,6-diisocyanate, 7.9% 1,6-hexane diol and 35.5% methyl-1,6-hexane diol isomeric mixture (prepared from commercial isomeric mixture of methyl cyclo hexanol) by reaction in toluene at 80° C. The polyurethane produced is freed from toluene and then ground into a powder and fractionated through sieves. Melting range 118 to 120° C.

The process of the invention is particularly useful for making seams, for example, in rainwear, shirts and the like.

This invention is further illustrated by the following examples in which parts are by weight unless otherwise specified.

EXAMPLE 1

About 20 grams per m.² of polyurethane heat sealing powder A (melting point 104° C.), having a particle size of about 0.3 to 0.5 mm., are distributed through a sieve on to an undyed cotton cross twill fabric which weighs about 200 g./m.². The cotton fabric onto which the powder has been scattered is then exposed for about 10 seconds to infra-red radiation at a distance of about 8 cm. The intensity of radiation from the 1300 watt radiator, which has a surface area of about 300 cm.², is then so great that acetanilide crystals of melting point 115° C. will have completely melted by the end of this time. The heat sealing powder on the surface is softened and it adheres to the fabric on cooling.

A second piece of the same cotton fabric is placed on to the sintered surface of the first fabric and is pressed for about 15 seconds in a flat iron press heated to about 150° C. and at a pressure of about 34 g./cm.². The composite material obtained has the following resistance to separation after cooling: 2.0 kg. wt./2.5 cm.; after trichloroethylene washing: 1.6 kg. wt./2.5 cm.; after washing in machine at 60° C.; 0.9 kg. wt./2.5 cm.

The values given represent the resistance to separation of the dried test sample. The stability of the bond in perchloroethylene at about 60° C. is particularly good. The resistance to separation in the moist state is, in this case, about 0.5 kg. wt./2.5 cm.

EXAMPLE 2

Using the same procedure as carried out in Example 1, cotton fabric is sintered with the polyurethane powder B of particle size about 0.3 to 0.5 mm. and pressed together with a second cotton fabric in the same way.

The composite material obtained has the following resistance to separation:

Without the action of solvent 1.9–2.2 kg. wt./2.5 cm. After 20 minutes storage in perchloroethylene 1.9–2.2 kg. wt./2.5 cm. After machine washing at 50° C. 0.7 kg. wt./2.5 cm. After three machine washings at 60° C. 0.7 kg. wt./2.5 cm.

The composite material obtained withstands several chemical cleanings in perchloroethylene under the normal conditions used, without any impairment of its bond strength.

EXAMPLE 3

A cotton fabric is sintered with polyurethane powder C of particle size about 0.3 to 0.5 mm. according to the same procedure described in Example 1, the infra-red radiation acting for about 15 seconds. The fabric is then bonded to a second cotton fabric by pressing in the same way. The composite material obtained has the following resistance to separation after cooling. Without the action of solvent 0.9–1.1 kg. wt./2.5 cm. After washing in perchloroethylene 0.8–1.1 kg. wt./2.5 cm. After machine washing at 60° C. 0.4–0.5 kg. wt./2.5 cm.

EXAMPLE 4

Using the same procedure as carried out in Example 1 a cotton fabric is sintered with the polyurethane powder D of a particle size of about 0.05 to 0.2 mm. and pressed together with a second cotton fabric in the same way.

The composite material obtained has the following resistance to separation:

| | |
|---|---|
| Without action of solvent | 1.5–2.1 Kg./5 cm. |
| After machine washing at 60° C | 1.3–1.8 Kg./5 cm. |
| After washing with perchloroethylene | 1.2–1.5 Kg./5 cm. |

It is to be understood that the foregoing examples are given for the purpose of illustration and that any other suitable polymer, textile or the like could be used provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention.

What is claimed is:

1. A method of bonding textiles which comprises assembling the textiles to be bonded in contact with a polymer of hexane-1,6-diisocyanate and a diol, at least 9 percent by weight of said polymer being based on 2-methylhexane-1,6-diol or 3-methylhexane-1,6-diol, and subjecting the assembly to heat and pressure.

2. The method of claim 1 wherein said polymer has a molecular weight of 3000 to 50,000.

3. The method of claim 1 wherein said polymer is prepared from hexane-1,6-diisocyanate and 2-methyl or 3-methylhexane-1,6-diol as essentially the sole polymer forming components and has a molecular weight of 3000 to 15,000.

4. The method of claim 1 wherein said polymer is prepared from a mixture of the recited methylhexane-1,6-diol with an additional monomeric organic diol.

5. The method of claim 1 wherein said textile is based on vegetable fibers.

6. The method of claim 1 wherein said textile is based on keratin fibers.

7. The method of claim 1 wherein said heat and pressure are at 100–200° C. and 10–75 grams per square centimeter.

8. The method of claim 1 wherein a mixture of at least 9 percent by weight of the polymer and less than 44 percent by weight of the polymer of 2-methyl or 3-methylhexane-1,6-diol is used in conjunction with hexane-1,6-diol as the sole diols in forming the polymer.

References Cited

UNITED STATES PATENTS

| | | |
|---|---|---|
| 3,328,225 | 6/1967 | Urbanic et al. |
| 3,300,370 | 1/1967 | Epstein et al. |
| 3,440,224 | 4/1967 | Impola et al. |

REUBEN EPSTEIN, Primary Examiner

U.S. Cl. X.R.

156—283; 161—190; 260—77.5